W. PANSCH & O. G. BARK.
SELF LOCKING BOLT.
APPLICATION FILED APR. 30, 1910.

976,096.

Patented Nov. 15, 1910.

Witnesses

Inventors:
William Pansch
And Otto G. Bark.

UNITED STATES PATENT OFFICE.

WILLIAM PANSCH AND OTTO G. BARK, OF CHICAGO, ILLINOIS.

SELF-LOCKING BOLT.

976,096.     Specification of Letters Patent.     Patented Nov. 15, 1910.

Application filed April 30, 1910. Serial No. 558,647.

*To all whom it may concern:*

Be it known that we, WILLIAM PANSCH and OTTO G. BARK, citizens of the United States, both residing at Chicago, in the county of Cook and State of Illinois, have invented certain new and useful Improvements in Self-Locking Bolts, of which the following is a specification.

This invention relates to improvements in self-locking bolts to be used for various purposes and in connection with numerous kinds of structures in which, by reason of the character of the construction or structure, the inner ends of the bolts, when used thereon, cannot be reached by means of a wrench or other means for tightening nuts thereon, and when the structure is of such a nature or construction that a screw cannot be readily and durably seated therein; as, for example, in the construction of steel cars, it is necessary to secure strips of molding to the corners of the walls and ceiling, and other pieces or devices to the walls, window-sashes and frames, as well as to the doors and frames therefor, the inner surfaces of which are made of such thin metal that they cannot be provided with adequately tapped or screw-threaded openings to furnish the desired durability for ordinary screws, and as the walls, sashes and frames are hollow and closed, it is evident the inner ends of the common bolts or screws which may be passed through plain openings, cannot be reached to tighten nuts thereon.

The principal object of the invention is to provide self-locking bolts which shall be simple and inexpensive in construction, strong, durable and efficient in operation, and so made that they can be readily and securely fixed in suitable openings in the parts or pieces to be connected together.

Other objects and advantages of the invention, will be disclosed in the subjoined description and explanation.

In order to enable others skilled in the art to which the invention pertains, to make and use the same, we will now proceed to describe it, referring to the accompanying drawings, in which—

Figure 1:
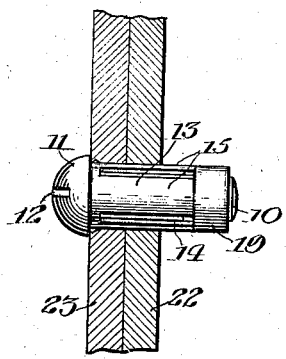
Figure 2:
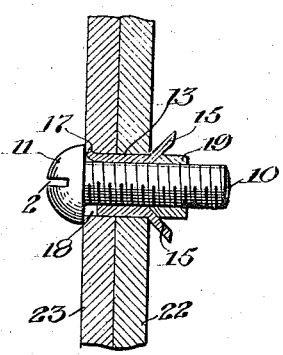
Figure 3:
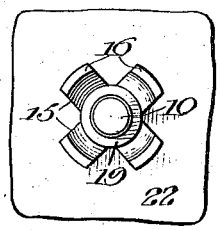
Figure 4:
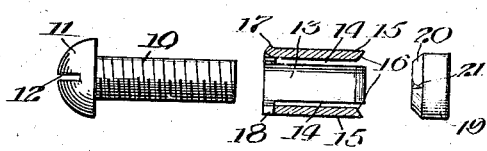
Figure 5:
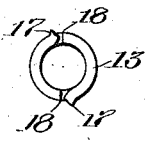

Figure 1, is a view partly in section and partly in elevation of a self-locking bolt embodying the invention, showing the same extended through a suitable opening in two pieces to be connected together, the parts of the bolt being arranged in their initial positions; Fig. 2, is a similar view of like parts, showing the members of the bolt in their locked positions; Fig. 3, is an inner face view of Fig. 2; Fig. 4, is a view partly in section and partly in elevation of the members of the bolt showing them detached; Fig. 5, is an outer end view of the sleeve; and Fig. 6, is a side view thereof.

Like numerals of reference, refer to corresponding parts throughout the different views of the drawing.

The reference numeral 10, designates the bolt, which may be made of any suitable size, form and material, but is screw-threaded, and is provided at one of its ends with a head 11, having a groove 12, for the reception of a screw driver used for turning the screw when desired to cause its parts to fasten two pieces together or to be locked in a suitable opening. Loosely fitted on the screw threaded bolt 10, is a sleeve 13, which is provided with a number of longitudinally disposed slots 14, which extend from the inner end of the sleeve to near its outer end and produce a series of arms or strips 15, each of which is slightly inwardly beveled at its free end as at 16, as shown in Fig. 4, of the drawing.

Figure 6:
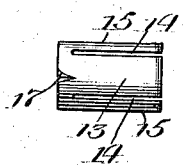

The outer end of the sleeve 13, is provided with two outwardly extended projections 17, which are preferably located diametrically opposite each other as shown in Fig. 5, and by preference are produced by cutting niches 18, in the outer end of the sleeve and turning one side of each of said niches outwardly as will be understood by reference to Figs. 5, and 6, of the drawing. These projections are very slight and are adapted to bite into or engage the wall of the opening in which the sleeve is inserted, yet so as to permit the outer end of the sleeve to be flush with the outer surface of the piece in which the opening is formed. Located on the inner portion of the screw threaded bolt 10, is a nut 19, which has its portion adjacent to the sleeve 13, beveled as at 20, and is also provided in said portion with a rib 21, to engage one of the arms 15, of the sleeve, when screwed up against the same.

In Figs. 1, and 2, of the drawing, the bolt is shown as being extended through two pieces which it is desired to connect together, one of these pieces 22, may be the inner surface of the wall of a steel car, and the other piece 23, may be a strip of molding, which it is desired to secure to the wall of the car. Each of these pieces is provided with an opening, which openings register one with the other. In using the bolt, the sleeve 13, is placed on the screw threaded bolt 10, so that its outer end will rest against the inner portion of the bolt head 11, when the nut 19, should be screwed up until it contacts with the beveled surfaces 16, of the arms 15, of the sleeve. When thus assembled, the parts may be passed through the openings in the pieces to be connected together, as shown in Fig. 1, when by turning the bolt in the proper direction, the projections 17, on the sleeve, will engage the wall of the opening in the piece 23, and hold the sleeve against rotation. As the bolt is turned further, the nut thereon, will be turned therewith and as the ribbed or roughened surface of the nut 19, engages the arms 15, of the sleeve, it, the nut, will be advanced toward the head of the bolt, thus spreading the arms 15, outwardly as shown in Fig. 2, of the drawing, thereby firmly securing the pieces 22, and 23, together and firmly locking the parts of the bolt in position.

Having thus fully described the invention, what we claim as new and desire to secure by Letters-Patent is—

In a self-locking bolt, the combination with a screw-threaded and headed bolt, of a sleeve loosely mounted on the bolt and extended through the openings in the pieces to be secured together, said sleeve having a series of longitudinally disposed arms extended at their free ends beyond the outer surface of one of the pieces to be secured together and having on its other end a peripheral and outward projection to bite into the outer surface of the other piece, and a nut mounted on and engaging the inner portion of the screw-threaded bolt and having its portion adjacent to the free ends of the arms of the sleeve beveled and provided with a rib, said nut adapted to divide the arms of the sleeve and to cause them to spread outwardly against the outer surface of one of the pieces to be secured to another piece.

WILLIAM PANSCH.
OTTO G. BARK.

Witnesses:
CHAS. C. TILLMAN,
J. E. HANSEN.